United States Patent
Adnani

(10) Patent No.: US 12,418,809 B2
(45) Date of Patent: Sep. 16, 2025

(54) SYSTEM AND METHOD FOR SPECTRUM MANAGEMENT AND COVERAGE OPTIMIZATION

(71) Applicant: ThinkRF Corporation, Kanata (CA)

(72) Inventor: Nikhil Adnani, Toronto (CA)

(73) Assignee: ThinkRF Corp.

( * ) Notice: Subject to any disclaimer, the term of this patent is extended or adjusted under 35 U.S.C. 154(b) by 413 days.

(21) Appl. No.: 18/061,035

(22) Filed: Dec. 2, 2022

(65) Prior Publication Data
US 2023/0199523 A1    Jun. 22, 2023

Related U.S. Application Data

(60) Provisional application No. 63/291,599, filed on Dec. 20, 2021.

(51) Int. Cl.
*H04W 24/10* (2009.01)
*H04W 24/02* (2009.01)

(52) U.S. Cl.
CPC .......... *H04W 24/02* (2013.01); *H04W 24/10* (2013.01)

(58) Field of Classification Search
CPC ..... H04W 24/02; H04W 24/10; H04W 24/00; H04W 24/08
See application file for complete search history.

(56) References Cited

U.S. PATENT DOCUMENTS

| | | | |
|---|---|---|---|
| 2019/0037418 A1* | 1/2019 | Gunasekara | H04W 52/40 |
| 2019/0181930 A1* | 6/2019 | Liu | H04B 7/065 |

* cited by examiner

*Primary Examiner* — Chuong A Ngo
(74) *Attorney, Agent, or Firm* — Stratford Group Ltd.

(57) ABSTRACT

A system and method for spectrum management and coverage optimization is provided. A system of geographically distributed spectrum monitoring nodes that capture signal activity over a desired band, for monitoring and optimizing performance, comprising one or more RF sensors wirelessly connected to at least one central server via a network. The RF sensors detect a plurality of RF signals from one or more transmitters and report one or more signal parameters to the central server. The RF sensors have one or more node settings that are software-defined. The RF sensors are capable of performing acquisition, demodulation, signal analysis and sending one or more results of the signal analysis to the central server and the central server determining node configuration. The central server is capable of dynamically adjusting one or more node settings and triggering one or more RF sensors to perform one or more signal captures.

20 Claims, 6 Drawing Sheets

SYSTEM AND METHOD FOR SPECTRUM MANAGEMENT AND COVERAGE OPTIMIZATION

FIELD OF THE INVENTION

The present disclosure relates to a system and method for the continuous extraction of transmitter characteristics using a network of geographically distributed radio sensors, more specifically, but not by way of limitation, more particularly to a network of geographically distributed radio sensors in the form of small, light-weight, outdoor IoT devices that extract transmitter characteristics including power level, frequency broadcast parameters, localization, statistical parameters of the signal and analytics to determine the validity of the raw data and the resulting parameter estimates for monitoring and optimizing network performance.

BACKGROUND

Any discussion of the related art throughout the specification should in no way be considered as an admission that such related art is widely known or forms part of common general knowledge in the field.

There is a growing need to monitor RF signals over larger frequency ranges. For instance, current commercial wireless systems span the frequency range from close to 0 Hz (DC) all the way up to 50 GHz. Regulatory organizations, Defense departments and Telecommunication service providers are interested in monitoring the radio spectrum for a variety of different applications. From situational awareness to competitive analysis there is a growing requirement to monitor the radio spectrum and extract more information from it.

Telecommunications Use Case

Prior to deploying a wireless network, a network service provider will conduct a drive test. The purpose of this test is to measure signal transmissions from cellular base stations while driving around. These base stations might be part of the service provider's infrastructure or they could be part of a competitor's network.

Data gathered during this test will be analyzed for various parameters including signal strength. In the case of LTE, parameters also include Cell ID, MIB and SIB. The purpose of this analysis is to determine how well the network performs over a certain geographic area. This analysis can then be used to improve the network. For instance, the drive test might lead to the discovery of coverage holes—areas where there is no (or limited) cellular coverage. In those situations, additional network infrastructure or tweaks to existing infrastructure might be necessary. In the case of studying a competitors' network, a drive test might lead to an understanding of how their system is deployed to maximize coverage.

Data Reliability

A common problem in RF drive testing is the actual reliability of the data that is gathered during a drive test. A typical drive test involves driving along a section of street and capturing signals from a transmitter such as an eNodeB in the case of LTE. In theory this should be largely a three-step process: Acquire data, Demodulate data and Extract parameters.

In the real world however, signals emitted from a transmitter are subject to propagation-related impairments. Additionally, the quality of the receiver is an important factor in determining how clean the received signal is.

A drive test then involves a manual process of sifting through data to eliminate invalid readings on account of the aforementioned factors. If the data captured is in fact invalid, there is a requirement to redo the drive test. Not only is this time intensive but there is a high likelihood that the transmitter may no longer be transmitting when the drive test is redone.

Changes in the Environment

The primary purpose of a drive test is for wireless network planning to deliver a system that is optimized for performance. However, there are many environmental factors that can change over time which can impact the network performance to varying degrees. For instance, RF interference can degrade performance. In the case of mmWave networks, even small changes like the construction of a new building can impact performance significantly. It is very difficult to adapt to changes in the environment based on the analysis of a limited data set at the initial stages of network deployment.

Cost

Drive tests require expensive truck rolls, and the costs can add up to be quite significant. Interference hunting costs can add up as well. In general, any post deployment network optimization can be very expensive and that does not include the costs associated with network outages.

Regulatory Monitoring Use Case

The purpose of regulatory monitoring is to ensure and enforce compliance with regulations. For instance, it is the role of regulatory monitoring to ensure that spectrum that has been licensed is not being interfered with. There have been many instances of unlawful, intentional transmissions in aircraft bands for instance and this can have significant negative impact. There is a growing need for constant, persistent monitoring of the radio spectrum. Conventional approaches whereby truck rolls are required to identify interferers can be very expensive.

There exists a need for a system and method of geographically distributed RF sensors that simultaneously and continuously capture and process signal transmissions in real-time. There is need for a system and method of capturing and processing signal transmissions in real-time by which RF sensor outputs are verified and weighted based on various factors to include the quality of the receiver and reception, that provides adjustments to the sensor are made to account for channel conditions and the application, that provides associated processing is conducted for parameter estimation and that provides recommendations on augmenting the existing RF sensor network are produced for better detection and analysis.

BRIEF SUMMARY

It is an object of the invention to provide a system and method of geographically distributed RF sensors that simultaneously and continuously capture and process signal transmissions in real-time.

In accordance with an aspect of the invention, there is provided a system of geographically distributed spectrum monitoring nodes that capture signal activity over a desired band, for monitoring and optimizing performance, comprising one or more RF sensors wirelessly connected to at least one central server via a network. The one or more RF sensors detecting a plurality of RF signals from one or more transmitters and reporting one or more signal parameters to the central server. The one or more RF sensors having one or more node settings that are software-defined, wherein the one or more RF sensors are capable of performing acquisition, demodulation, signal analysis and sending one or more results of the signal analysis to the central server and the central server determining node configuration, wherein the central server is capable of dynamically adjusting the one or more node settings and triggering the one or more RF sensors to perform one or more signal captures.

In accordance with another aspect of the invention, there is provided a method of monitoring and optimizing performance for captured signal activity over a desired band by geographically distributed spectrum monitoring nodes comprising detecting, by one or more RF sensors, a plurality of RF signals from one or more transmitters. Analyzing, by the one or more RF sensors, the plurality of RF signals. Performing, by the one or more RF sensors, demodulation and signal analysis. Reporting, by the one or more RF sensors, one or more signal parameters to at least one central server. Sending, by the one or more RF sensors, one or more results of the signal analysis to the central server. Determining, by the central server, node configuration. Dynamically adjusting, by the central server, one or more node settings from the one or more RF sensors and triggering, by the one or more node settings, the one or more RF sensors to perform one or more signal captures.

In accordance with an additional aspect of the invention, there is provided a method of monitoring and optimizing performance for captured signal activity over a desired band by geographically distributed spectrum monitoring nodes comprising triggering, by an event, the one or more RF signals to perform one or more signal captures. Detecting, by one or more RF sensors, a plurality of RF signals from one or more transmitters. Analyzing, by the one or more nodes, the plurality of RF signals. Performing, by the one or more RF sensors, demodulation and signal analysis. Reporting, by the one or more RF sensors, one or more signal parameters to at least one central server. Sending, by the one or more RF sensors, one or more results of the signal analysis to the central server. Determining, by the central server, node configuration and dynamically adjusting, by the central server, one or more node settings from the one or more RF sensors.

In accordance with an embodiment of the invention, the one or more RF sensors are software-defined radio (SDR) receivers.

In accordance with an embodiment of the invention, the node configuration is dependent upon the one or more node settings.

In accordance with an embodiment of the invention, the node configuration is dependent upon quality factor of reception.

In accordance with an embodiment of the invention, the one or more signal parameters include one or more of a grouping consisting of signal strength, saturation level, signal-to-noise ratio, signal bandwidth, receiver sensitivity, channel power and hardware quality of the RF sensor.

In accordance with an embodiment of the invention, the one or more RF sensors are further optimized via an external antenna.

In accordance with an embodiment of the invention, the dynamic adjustment is on a periodic basis.

In accordance with an embodiment of the invention, the dynamic adjustment includes one or more of a grouping consisting of gain, attenuation, filtering, a periodic physical repositioning of the one or more RF sensors and a change in orientation of an external antenna.

In accordance with an embodiment of the invention, the dynamic adjustment is triggered by the central server.

In accordance with an embodiment of the invention, the dynamic adjustment is triggered by the one or more RF sensors.

In accordance with an embodiment of the invention, the dynamic adjustment is event driven by the central server.

In accordance with an embodiment of the invention, the dynamic adjustment is event driven by the one or more RF sensors.

In accordance with an embodiment of the invention, the sending one or more results of the signal analysis to the central server is dependent upon meeting one or more pre-defined criteria.

In accordance with an embodiment of the invention, the one or more RF sensors are triggered to perform the one or more signal captures at a particular time of day.

In accordance with an embodiment of the invention, the triggering of the one or more signal captures is event driven by the central server.

In accordance with an embodiment of the invention, the triggering of the one or more signal captures is event driven by the one or more RF sensors.

In accordance with an embodiment of the invention, the network is the Internet.

In accordance with an embodiment of the invention, the network is a private network.

In accordance with an embodiment of the invention, the node configuration includes a location of one or more of the RF sensors, a position of one or more of the RF sensors, and augmentation of one or more of the RF sensors to one or more differing the RF sensors.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

In the figures, embodiments are illustrated by way of example. It is to be expressly understood that the description and figures are only for the purpose of illustration and as an aid to understanding.

Figure 1:
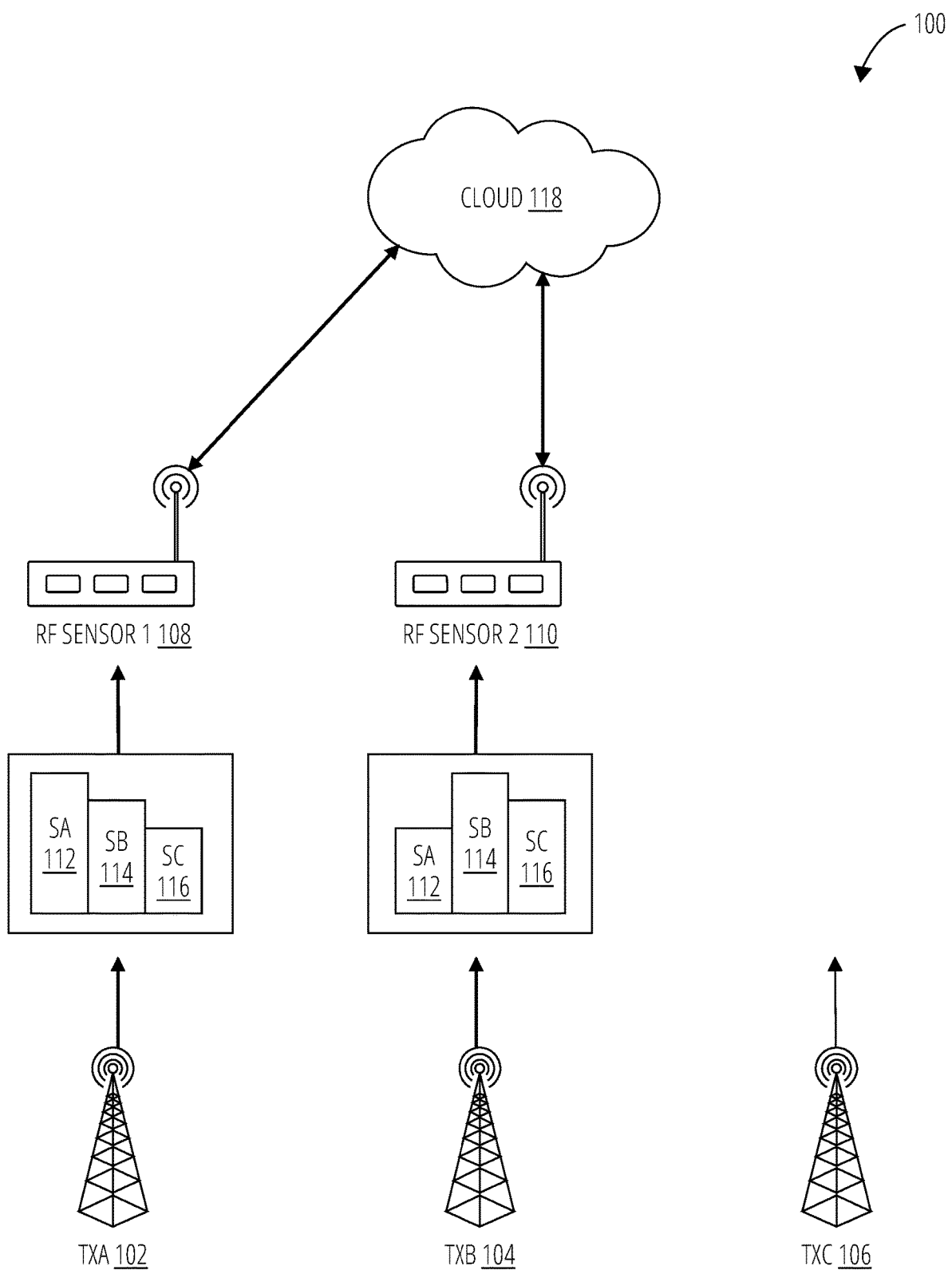

Embodiments will now be described, by way of example only, with reference to the attached figures, wherein the figures:

FIG. 1 illustrates an aspect of the subject matter in accordance with one embodiment.

Figure 2:
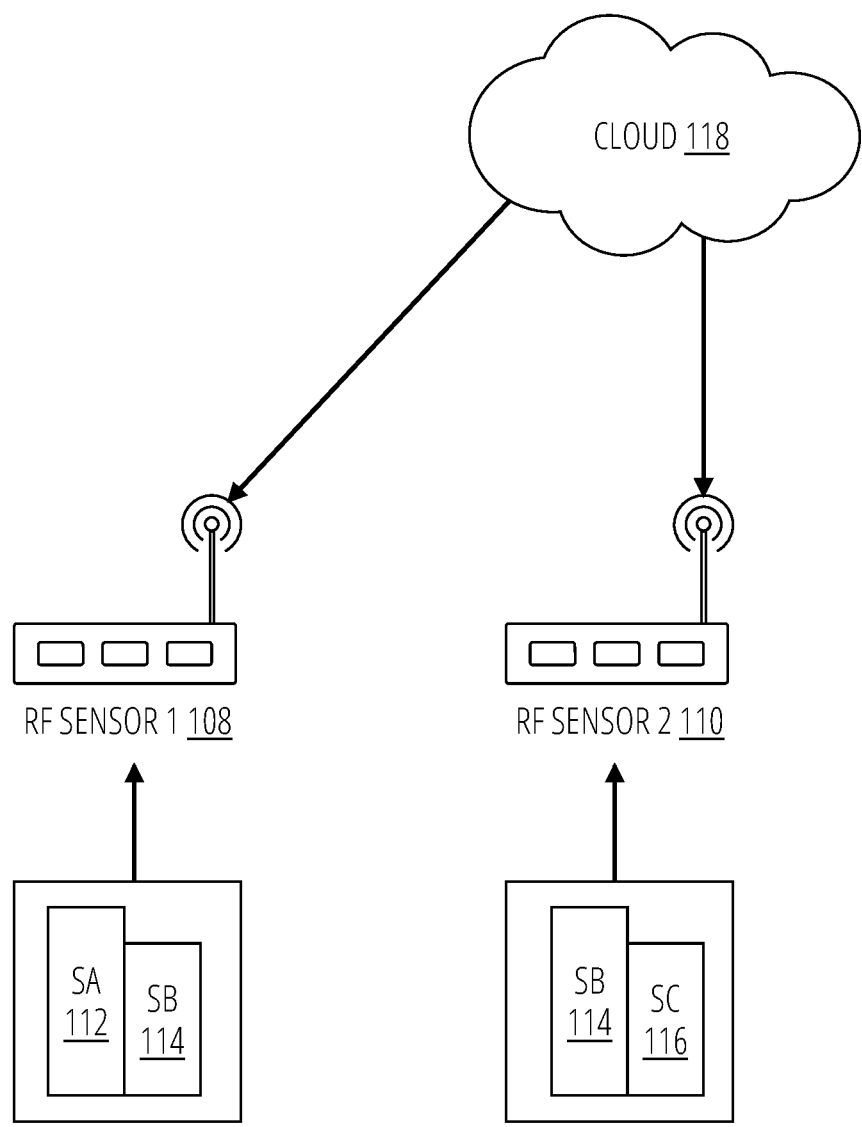

FIG. 2 illustrates an aspect of the subject matter in accordance with one embodiment.

Figure 3:
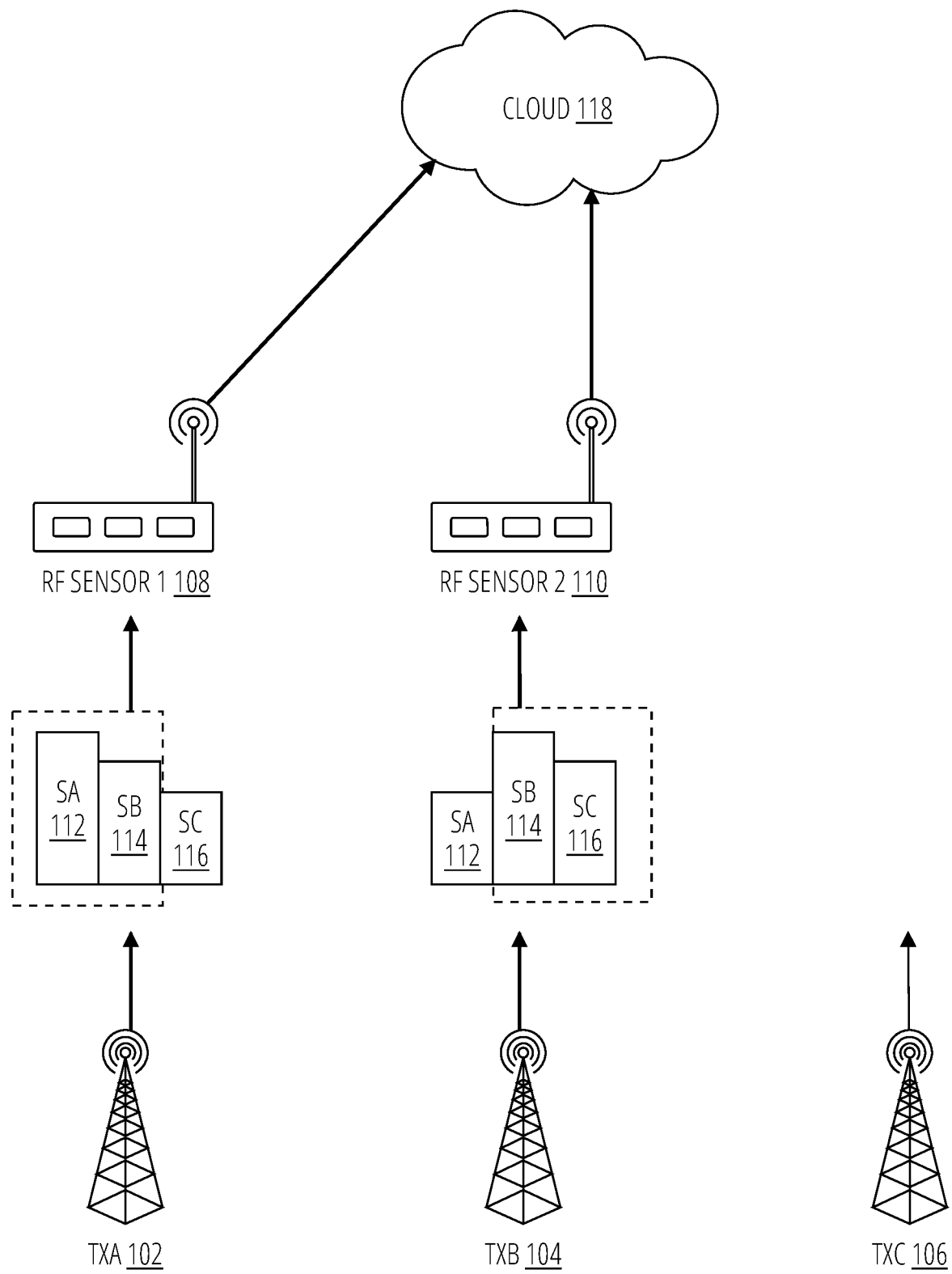

FIG. 3 illustrates an aspect of the subject matter in accordance with one embodiment.

Figure 4:
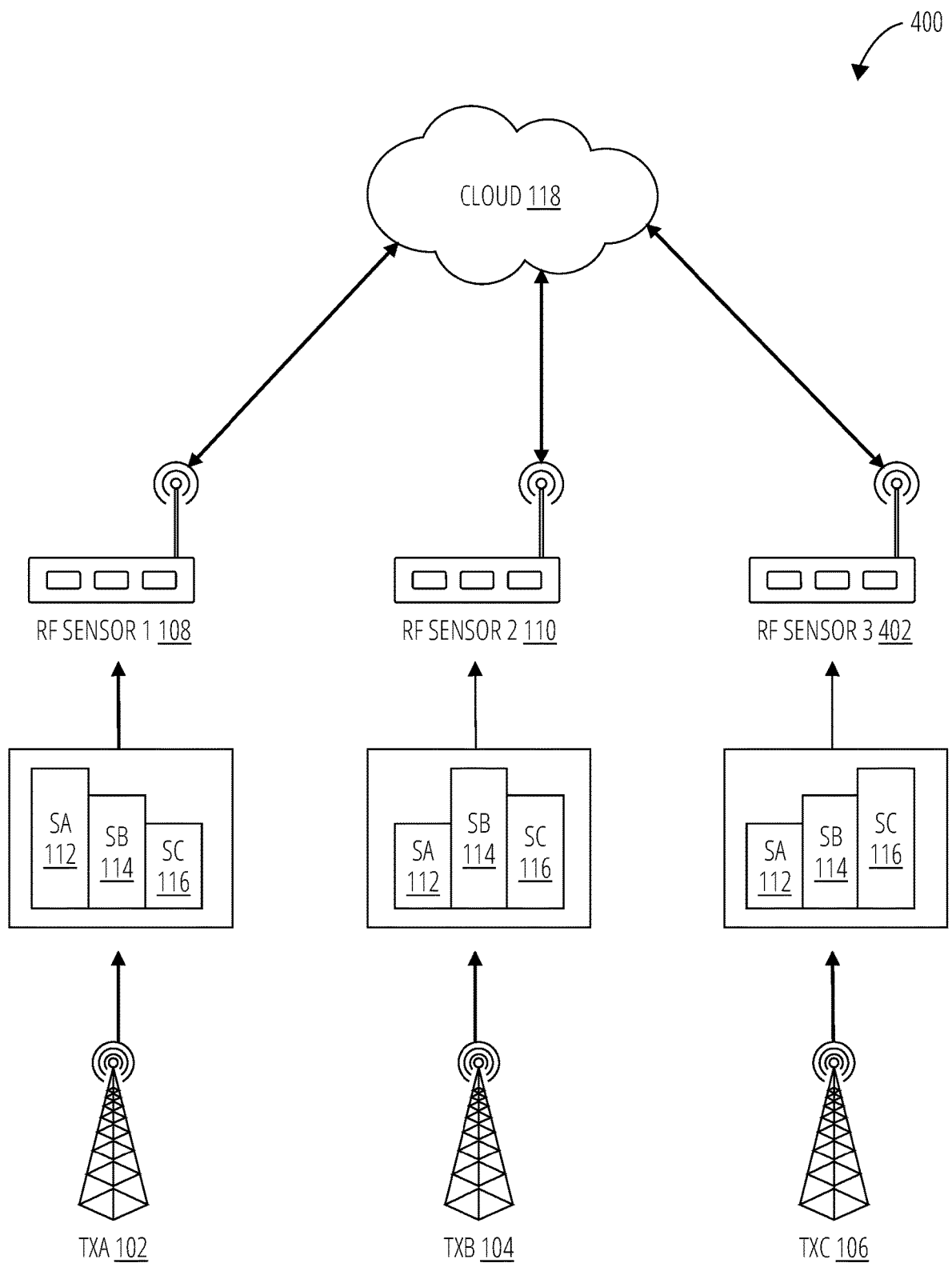

FIG. 4 illustrates an aspect of the subject matter in accordance with one embodiment.

Figure 5:
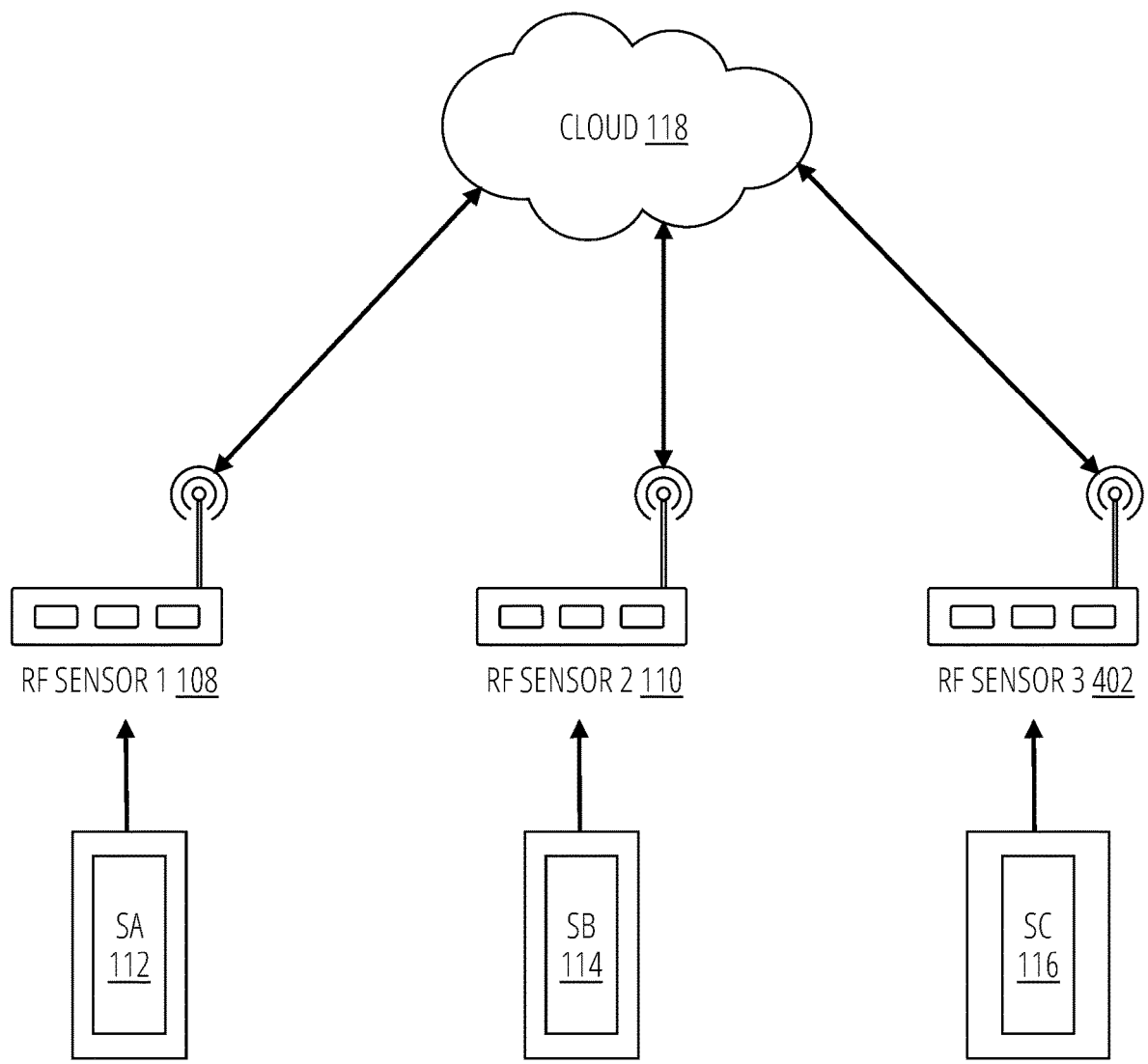

FIG. 5 illustrates an aspect of the subject matter in accordance with one embodiment.

Figure 6:
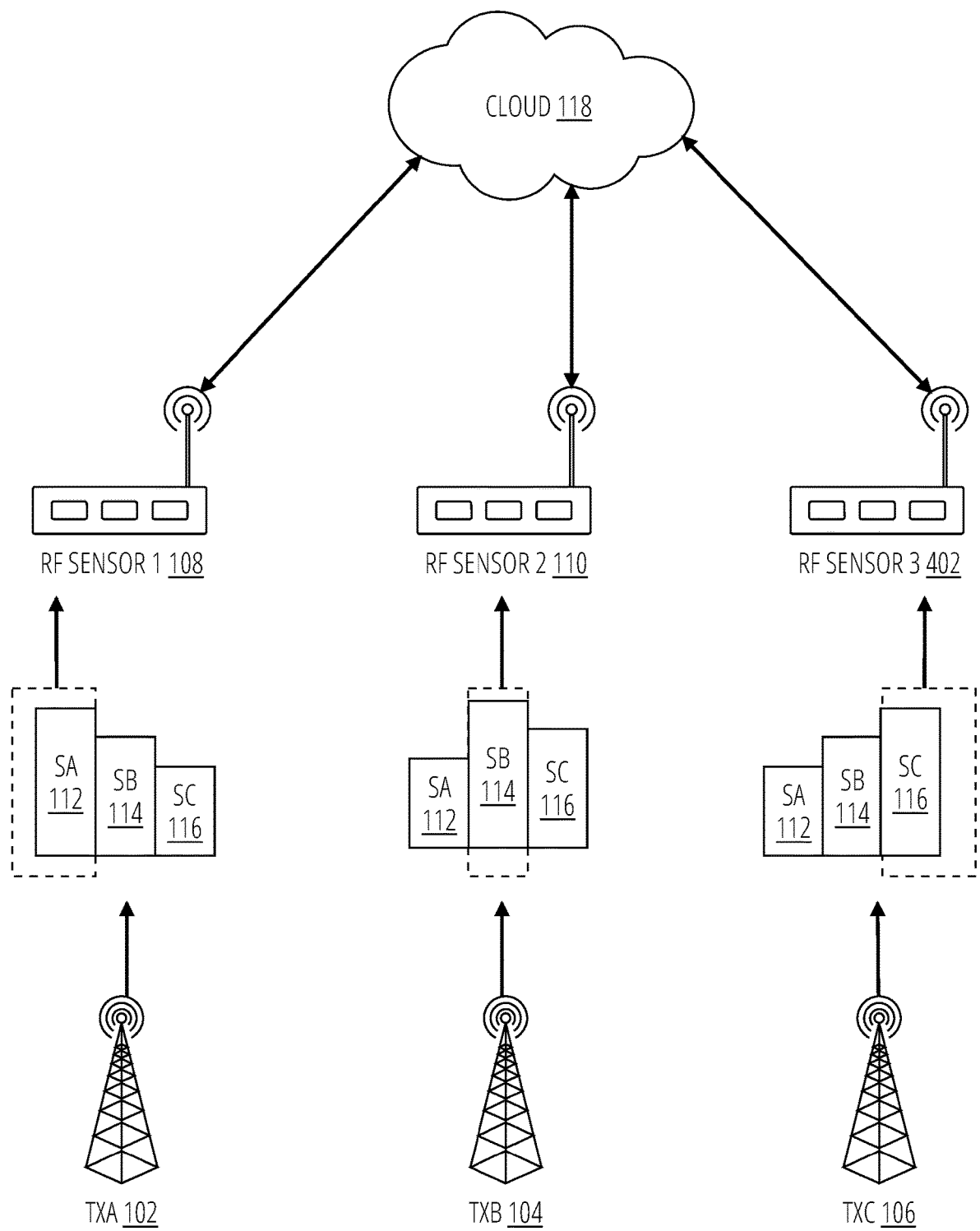

FIG. 6 illustrates an aspect of the subject matter in accordance with one embodiment.

DETAILED DESCRIPTION

The details of one or more embodiments of the subject matter of this specification are set forth in the accompanying drawings and the description below. Other features, aspects, and advantages of the subject matter will become apparent from the description, the drawings, and the claims.

Like reference numbers and designations in the various drawings indicate like elements.

Cell phones contain dedicated receivers for signal demodulation. For instance, a 4G phone can demodulate various parameters of an LTE signal. The entire receiver within a 4G phone is optimized for this purpose. For example, the receiver contains dedicated hardware for the bands of operation, and it is optimized for LTE signals. A mmWave 5G receiver will be similarly optimized for 5G signals in mmWave bands.

By contrast, RF sensors are software-defined radio (SDR) receivers that are connected either directly to the Internet or via a single board computer to the internet. SDRs receive radio signals over a wide frequency range. They may be optimized for performance within dedicated bands of interest with the use of filters and amplifiers. In general, SDR based receivers are more versatile and can be optimized for better performance. For example, with the use of better/external antennas, etc.

SDRs take as input analog RF signals. These signals are converted to digital form. Signals are then processed digitally to determine key parameters that include but are not limited to:

Signal strength
Signal-to-noise ratio
Signal Bandwidth
Channel power

These quantities are used to determine whether the received signal is, for instance distorted due to receiver overload or too close to the noise floor. A received signal that is within the optimal operating range of the radio receiver may be analyzed further to determine transmit signal parameters. However, if it is not within a specified operating range, the radio receiver may be adjusted to either add more gain, attenuation, filtering to account for prevailing channel conditions, a periodic physical repositioning of one or more RF sensors and a change in orientation of an external antenna.

Depending on whether thresholds are achieved, the sensor might pass parametric information, or the raw data associated with the signal along with a measure of signal quality to the cloud. Signal levels associated with any band and sensor with a higher quality factor are weighted accordingly and used preferentially over others for parameter estimation. In FIGS. 1-6, multiple sensors are shown distributed around multiple transmitters of interest.

Quality factor itself might be used to adjust a sensor location, position or as a driver to augment a sensor with another.

The benefits of this system presented herein are:
If a signal from a sensor cannot be processed (for example the transmitter might be too far away and the signal too weak) then another sensor that's closer to it can be used for detection and analysis of the transmitter signal
The quality of reception that, when accounted for, allows for the elimination of bad data. This allows for optimal use of bandwidth consumption from the sensor to the cloud
It allows for sensor deployment planning—for instance it tells you where additional—maybe even lower cost sensors should be deployed to complement the existing network Raw data from RF sensors is locally processed to determine parameters associated with the transmitted signal. These parameters are passed on to a processor in the cloud depending on whether they meet pre-specified threshold criteria. The receiver also passes along various parameters including but not limited to: Saturation level, Signal level, SNR, Channel power, receiver sensitivity and Hardware quality. All this data is used with a local processor to determine the validity or confidence level of parameter estimates.

Parameters from RF sensors are passed to the cloud for an additional stage of global processing to determine if the local configuration is adequate and optimal or if it needs to be adjusted. For example, at a global level a decision might be made to adjust any or all receiver nodes to optimize the hardware such that they are configured for optimal reception within a smaller geographic area than prior.

A system of geographically distributed spectrum monitoring nodes that capture signal activity over a desired band is presented herein. A system of geographically distributed spectrum monitoring nodes for monitoring and/or optimizing performance comprising one or more RF sensors wirelessly connected to at least one central server via the Internet or a private network.

The RF sensors detecting a plurality of RF signals from one or more transmitters and reporting one or more signal parameters to the central server. The RF sensors having one or more node settings that are software-defined, wherein the RF sensors are capable of performing acquisition, demodulation, signal analysis and sending one or more results of the signal analysis to the central server and the central server determining node configuration, wherein the central server is capable of dynamically adjusting the node settings and triggering the RF sensors to perform one or more signal captures. In some embodiments, the dynamic adjustment is performed on a periodic basis. In some embodiments, the dynamic adjustment may be triggered by the central server or by one or more RF sensors or may be event driven by the central server or by one or more RF sensors. In some embodiments, the node configuration is dependent upon the node settings. In some embodiments, the node configuration is dependent upon quality factor of the reception of the received RF signals. In some embodiments, one or more RF sensors are triggered to perform one or more signal captures at a particular time of day.

FIG. 1 illustrates a high-level diagram 100 of a system for continuous extraction of transmitter characteristics using a network of geographically distributed radio sensors, according to some embodiments. FIG. 1 displays three transmitters of interest (TxA 102, TxB 104, and TxC 106) and two RF sensor nodes (RF sensor 1 108 and RF sensor 2 110). The transmitters are shown sending signals comprising distinct signals (SA 112, SB 114 and SC 116). Each node receives signals from the transmitters and the transmitted signals are separated in time and/or frequency and sent to a central server (cloud 118). RF sensor 1 108 receives signals SA 112, SB 114 and SC 116 in decreasing channel power from transmitters TXA 102, TXB 104 and TXC 106 respectively and RF sensor 2 110 receives signals SB 114, SC 116 and SA 112 in decreasing channel power from TXB 104, TXC 106 and TXA 102 respectively.

Parameter estimates for transmitters TXA 102, TXB 104 and TXC 106 are then passed to the cloud 118 by RF sensor 1 108 and RF sensor 2 110 along with signal metrics including but not limited to channel power, peak amplitude, and bandwidth. Nodes may be adjusted by adding amplification or attenuation to optimize for signal reception of signals from three transmitters.

A global view of the parameters and relative signal amplitudes might result in a decision to optimize in the following manner for parameter extraction (shown in FIG. 2):

RF sensor 1 108 for the reception of signals SA 112 and SB 114 from transmitters TXA 102 and TXB 104 only
RF sensor 2 110 for reception of signals SB 114 and SC 116 from transmitters TXB 104 and TXC 106 only The decision is sent from the cloud 118 to each of the RF sensor 1 108 and the RF sensor 2 110 for the particular parameter extraction method presented above.

FIG. 3 displays the implementation of the parameter extraction optimization from FIG. 2. RF sensor 1 108 is shown selectively receiving signals SA 112 and SB 114 from transmitters TXA 102 and TXB 104 while RF sensor 2 110 is shown selectively receiving signals SB 114 and SC 116 from transmitters TXB 104 and TXC 106.

FIG. 4 illustrates an alternative high-level diagram 400 of a system for continuous extraction of transmitter characteristics using a network of geographically distributed radio sensors, according to some embodiments. FIG. 4 displays three transmitters of interest (TxA 102, TxB 104, and TxC 106) and three RF sensor nodes (RF sensor 1 108, RF sensor 2 110 and RF sensor 3 402). The transmitters are shown sending signals comprising distinct signals (SA 112, SB 114 and SC 116). Similar to FIG. 1, each node receives signals from the transmitters and the transmitted signals are separated in time and/or frequency and sent to a central server (cloud 118). RF sensor 1 108 receives signals SA 112, SB 114 and SC 116 in decreasing channel power from transmitters TXA 102, TXB 104 and TXC 106 respectively, RF sensor 2 110 receives signals SB 114, SC 116 and SA 112 in decreasing channel power from TXB 104, TXC 106 and TXA 102 respectively and RF sensor 3 402 receives signals SC 116, SB 114 and SA 112 in decreasing channel power from TXC 106, TXB 104 and TXA 102 respectively.

A dense deployment of low-cost nodes could likely result in better overall signal reception. In this example, a decision was made to optimize in the following manner for parameter extraction (shown in FIG. 5):

RF sensor 1 108 for the reception of signals SA 112 from transmitter TXA 102 only RF sensor 2 110 for reception of signals SB 114 from transmitter TXB 104 only RF sensor 3 402 for reception of signals SC 116 from transmitter TXC 106 only The decision is sent from the cloud 118 to each of the RF sensor 1 108, the RF sensor 2 110 and the RF sensor 3 402 for the particular parameter extraction method presented above. Additionally, node optimization depends on application—for instance, if an application requires lower signal-to-noise ratios than others then an optimization in the above example might allow for the consideration of data from all three transmitters.

FIG. 6 displays the implementation of the parameter extraction optimization from FIG. 3. RF sensor 1 108 is shown selectively receiving signal SA 112 from transmitter TXA 102, RF sensor 2 110 is shown selectively receiving signal SB 114 from transmitter TXB 104 and RF sensor 3 402 is shown selectively receiving signal SC 116 from transmitter TXC 106.

The foregoing descriptions of specific embodiments of the present invention have been presented for purposes of illustration and description. They are not intended to be exhaustive or to limit the invention and method of use to the precise forms disclosed. Obviously, many modifications and variations are possible in light of the above teaching. As can be understood, the examples described above are intended to be exemplary only.

The embodiments described were chosen and described in order to best explain the principles of the invention and its practical application, and to thereby enable others skilled in the art to best utilize the invention and various embodiments with various modifications as are suited to the particular use contemplated. It is understood that various omissions or substitutions of equivalents are contemplated as circumstance may suggest or render expedient but is intended to cover the application or implementation without departing from the spirit or scope of the claims of the present invention.

The term "connected", "attached", "affixed" or "coupled to" may include both direct coupling (in which two elements that are coupled to each other contact each other) and indirect coupling (in which at least one additional element is located between the two elements).

As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. A system of geographically distributed spectrum monitoring nodes that capture signal activity over a desired band, for monitoring and optimizing performance, comprising:
   one or more RF sensors wirelessly connected to at least one central server via a network, said one or more RF sensors detecting a plurality of RF signals from one or more transmitters and reporting one or more signal parameters to said central server;
   said one or more RF sensors having one or more node settings that are software-defined, wherein said one or more RF sensors are capable of performing acquisition, demodulation, signal analysis and sending one or more results of said signal analysis to said central server; and
   said central server determining node configuration, wherein said central server is capable of dynamically adjusting said one or more node settings and triggering said one or more RF sensors to selectively perform one or more signal captures of the plurality of RF signals detected, according to said adjusted one or more node settings.

2. The system of claim 1, wherein said one or more RF sensors are software-defined radio (SDR) receivers.

3. The system of claim 1, wherein said node configuration is dependent upon said one or more node settings.

4. The system of claim 1, wherein said node configuration is dependent upon quality factor of reception.

5. The system of claim 1, wherein said one or more signal parameters include one or more of a grouping consisting of signal strength, saturation level, signal-to-noise ratio, signal bandwidth, receiver sensitivity, channel power and hardware quality of the RF sensor.

6. The system of claim 1, wherein said one or more RF sensors are further optimized via an external antenna.

7. The system of claim 1, wherein said dynamic adjustment is on a periodic basis.

8. The system of claim 1, wherein said dynamic adjustment includes one or more of a grouping consisting of gain, attenuation, filtering, a periodic physical repositioning of said one or more RF sensors and a change in orientation of an external antenna.

9. The system of claim 1, wherein said dynamic adjustment is triggered by said central server.

10. The system of claim 1, wherein said dynamic adjustment is triggered by said one or more RF sensors.

11. The system of claim 1, wherein said dynamic adjustment is event driven by said central server.

12. The system of claim 1, wherein said dynamic adjustment is event driven by said one or more RF sensors.

13. The system of claim 1, wherein said sending one or more results of said signal analysis to said central server is dependent upon meeting one or more pre-defined criteria.

14. The system of claim 1, wherein said one or more RF sensors are triggered to perform said one or more signal captures at a particular time of day.

15. A method of monitoring and optimizing performance for captured signal activity over a desired band by geographically distributed spectrum monitoring nodes comprising:
- detecting, by one or more RF sensors, a plurality of RF signals from one or more transmitters;
- analyzing, by said one or more RF sensors, said plurality of RF signals;
- performing, by said one or more RF sensors, demodulation and signal analysis;
- reporting, by said one or more RF sensors, one or more signal parameters to at least one central server;
- sending, by said one or more RF sensors, one or more results of said signal analysis to said central server;
- determining, by said central server, node configuration;
- dynamically adjusting, by said central server, one or more node settings from said one or more RF sensors; and
- triggering said one or more RF sensors to selectively perform one or more signal captures of the plurality of RF signals detected, according to said adjusted one or more node settings.

16. The method of claim 15, wherein said triggering of said one or more signal captures is event driven by said central server.

17. The method of claim 15, wherein said triggering of said one or more signal captures is event driven by said one or more RF sensors.

18. A method of monitoring and optimizing performance for captured signal activity over a desired band by geographically distributed spectrum monitoring nodes comprising:
- detecting, by one or more RF sensors, a plurality of RF signals from one or more transmitters;
- triggering, by an event, said one or more RF sensors to selectively perform one or more signal captures of the plurality of RF signals;
- analyzing, by said one or more nodes, said plurality of RF signals;
- performing, by said one or more RF sensors, demodulation and signal analysis;
- reporting, by said one or more RF sensors, one or more signal parameters to at least one central server;
- sending, by said one or more RF sensors, one or more results of said signal analysis to said central server;
- determining, by said central server, node configuration; and
- dynamically adjusting, by said central server, one or more node settings of said one or more RF sensors, said one or more RF sensors selectively performing said one or more signal captures of the plurality of RF signals detected, according to said adjusted one or more node settings.

19. The method of claim 18, wherein said triggering of said one or more signal captures is event driven by said central server.

20. The method of claim 18, wherein said triggering of said one or more signal captures is event driven by said one or more RF sensors.

* * * * *